US008734562B2

(12) United States Patent
Akimoto et al.

(10) Patent No.: US 8,734,562 B2
(45) Date of Patent: May 27, 2014

(54) NICKEL POWDER, METHOD FOR MANUFACTURING SAME, CONDUCTOR PASTE, AND MULTILAYER CERAMIC ELECTRONIC COMPONENT USING SAME

(75) Inventors: Yuji Akimoto, Fukuoka (JP); Kazuro Nagashima, Ohnojo (JP); Hidenori Ieda, Fukuoka (JP); Hitomi Yanagi, Okawa (JP)

(73) Assignee: Shoei Chemical Inc., Tokyo (JP)

( * ) Notice: Subject to any disclaimer, the term of this patent is extended or adjusted under 35 U.S.C. 154(b) by 11 days.

(21) Appl. No.: 13/351,028

(22) Filed: Jan. 16, 2012

(65) Prior Publication Data

US 2012/0114945 A1 May 10, 2012

Related U.S. Application Data

(62) Division of application No. 12/074,127, filed on Feb. 29, 2008, now Pat. No. 8,128,725.

(30) Foreign Application Priority Data

Mar. 12, 2007 (JP) .................................. 2007-61374

(51) Int. Cl.
C22C 19/00 (2006.01)
C23C 8/10 (2006.01)
C22C 1/04 (2006.01)

(52) U.S. Cl.
USPC ............... 75/255; 75/331; 148/277; 148/283; 148/286; 148/675

(58) Field of Classification Search
USPC ............. 75/255, 331; 148/277, 283, 286, 675
See application file for complete search history.

(56) References Cited

U.S. PATENT DOCUMENTS

| 7,658,995 B2 * | 2/2010 | Yoshida ........................ 428/402 |
| 2007/0125195 A1 | 6/2007 | Akimoto et al. |
| 2007/0254156 A1 | 11/2007 | Yoshida |

FOREIGN PATENT DOCUMENTS

| EP | 1 785 207 A1 | 5/2007 |
| JP | 11-080816 | 3/1999 |
| JP | 11-080817 | 3/1999 |
| JP | 2000-045001 | 2/2000 |
| JP | 2006-037195 | 2/2006 |
| JP | 2006-099965 | 4/2006 |
| WO | WO 2005/123307 A1 | 12/2005 |

* cited by examiner

*Primary Examiner* — Lois Zheng

(74) *Attorney, Agent, or Firm* — Flynn, Thiel, Boutell & Tanis, P.C.

(57) ABSTRACT

A nickel powder with an average particle size of 0.05 to 1.0 μm, which is composed of nickel particles having an oxidized surface layer and containing sulfur, wherein the sulfur content with respect to the total weight of the powder is 100 to 2000 ppm, and the intensity of a peak identified to sulfur bonded to nickel in surface analysis by ESCA of the nickel particles varies in a direction toward the center from the surface of the particles, and this intensity has its maximum at a location deeper than 3 nm from the particle outermost surface. This nickel powder is manufactured by bringing a nickel powder containing sulfur and dispersed in a non-oxidizing gas atmosphere into contact with an oxidizing gas at a high temperature.

3 Claims, 9 Drawing Sheets

NICKEL POWDER, METHOD FOR MANUFACTURING SAME, CONDUCTOR PASTE, AND MULTILAYER CERAMIC ELECTRONIC COMPONENT USING SAME

This is a divisional of prior U.S. application Ser. No. 12/074,127, filed Feb. 29, 2008 now U.S. Pat. No. 8,128,725.

BACKGROUND OF THE INVENTION

1. Field of the Invention

The present invention relates to a nickel powder, in particular, nickel powder suitable for forming electrodes in multilayer ceramic electronic components, such as multilayer capacitors, multilayer inductors, and multilayer actuators, to a conductor paste comprising the nickel powder, and a multilayer ceramic electronic component using the same.

2. Description of the Related Art

A multilayer ceramic electronic component (also referred to hereinbelow as "multilayer electronic component") is usually manufactured in the manner as follows. A ceramic raw material powder such as dielectric, magnetic, or piezoelectric material powder is dispersed in a resin binder and formed into sheets to prepare ceramic green sheets (referred to hereinbelow as "ceramic sheets"). A conductor paste for an internal electrode that is prepared by dispersing an inorganic powder comprising an electrically conductive powder as the main component and, optionally, a ceramic powder or the like in a vehicle comprising a resin binder and a solvent is printed according to a predetermined pattern on the ceramic sheets and dried to remove the solvent and form a dry film of the inner electrode. A plurality of ceramic sheets, each having the dry film for the inner electrode that were thus obtained, are laminated and pressurized to obtain a non-fired laminate in which the ceramic sheets and paste layers of inner electrodes are alternately laminated. The laminate is cut to a predetermined shape, then subjected to a binder removal process in which the binder is burned and dissipated, and fired at a high temperature whereby sintering of the ceramic layers and formation of the inner electrode layers are conducted simultaneously and a ceramic body is obtained. Terminal electrodes are then fused to both end surfaces of the body and a multilayer electronic component is obtained. The terminal electrodes and the unfired multilayer body are sometimes simultaneously fired (i.e., co-fired).

In recent years, powders of base metals such as nickel and copper are mainly used instead of powders of noble metals such as palladium and silver as electrically conductive powders of conductor pastes for inner electrodes. Accordingly, firing of the laminate is usually carried out in a non-oxidizing atmosphere with an extremely low partial pressure of oxygen in order to prevent the oxidation of the base metal during firing.

As a demand for miniaturized, highly multilayer electronic components has been growing in recent years, a rapid transition has been made to reducing the thickness of layers in both the ceramic layers and the inner electrode layers, in particular, in multilayer ceramic capacitors using nickel as an electrically conductive powder. As a result, ceramic sheets of smaller thickness came into use and also extremely fine nickel powder with a particle size of 1 µm or less, and even 0.5 µm or less, came into use for conductor pastes for inner electrodes.

Nevertheless, with such an extremely fine nickel powder, the nickel particles are over-sintered and lead to particle growth during the firing of a capacitor, which creates large voids in an internal electrode, and another problem is that the electrode ends up being thicker, so there is a limit to how much the thickness can be reduced.

Also, a fine nickel powder is highly active, and its sintering commencement temperature is extremely low. Particularly when it is fired in a non-oxidizing atmosphere, sintering and shrinkage commence at an early stage (such as at a low temperature of 400° C. or below), even with single crystal particles of relatively low activity. On the other hand, the ceramic particles that make up ceramic sheets generally start to undergo sintering at a much higher temperature than nickel powder particles. Therefore, when ceramic sheets and an internal electrode paste containing the above-mentioned nickel powder are co-fired, since the ceramic layer does not shrink together with the nickel film, the nickel film is pulled in the planar direction. Consequently, it is believed that voids produced in the nickel film by sintering at a relatively low temperature tend to expand into large voids as sintering proceeds in a higher temperature range. When such large voids are produced in an internal electrode, the electrode becomes discontinuous, which raises its resistance or leads to disconnection, so the electrostatic capacity of a capacitor decreases.

Furthermore, because of volumetric expansion and shrinkage caused by the redox reaction of nickel during firing, the sintering shrinkage behavior of the nickel film does not match that of the ceramic layer, and this results in delamination, cracking, and other such structural defects, and decreases the yield and reliability.

To solve these problems, Japanese Publication No. 2000-45001 A, for example, discloses that if a dense oxidation film having a certain thickness is formed on the surface of a nickel powder, changes in the volume and weight due to redox of the nickel during firing will be kept small, and the sintering commencement temperature will be raised, allowing delamination to be effectively prevented.

Also, Japanese Patent Publication Nos. 11-80816 A, 11-80817 A and 2006-37195 A disclose nickel powders containing sulfur. For example, Japanese Patent Publication No. 2006-37195 A discloses that a compound layer containing nickel and sulfur, such as Ni—S or Ni—S—O, is provided on the surface of a nickel powder by treating the powder with a sulfur gas or a sulfur compound-containing gas, preferably after surface oxidation. It is stated that this surface layer containing nickel and sulfur suppresses oxidation and reduction of the nickel powder during firing, and particularly in the binder removal step, and raises the sintering commencement temperature, so the oxidation behavior, reduction behavior, and sintering behavior of the nickel powder are improved and, as a result, delamination is suppressed in the course of manufacturing a multilayer ceramic capacitor.

The oxidation layer formed on the nickel powder surface as mentioned in Japanese Patent Publication No. 2000-45001 A lowers the activity at the nickel surface, and therefore reduces structural defects in multilayer electronic components, and is effective at preventing an increase in resistance of an internal electrode, but the effect is still not satisfactory. In particular, if the nickel particle size is on the submicron order, and especially if it is 0.5 µm or smaller, then it becomes impossible to suppress the disconnection of the electrodes and, furthermore, there may be problems such as a decrease in reliability, the generation of structural defects, and the deterioration of capacitor characteristics, which are thought to be due to the incomplete decomposition of the vehicle components in the binder removal step. Specifically, even though it has an oxidation layer, an extremely fine nickel powder such as this is highly active, so it acts as a decomposition catalyst on the vehicle, and the resin may explosively decompose at temperatures below its ordinary decomposition temperature. If this happens, the sudden generation of gas can cause cracking or delamination. Also, because the reaction is so sudden, the resin may not completely volatilize in the binder removal step, leading to carbonaceous residues such as carbon or carbon compounds, and this pulls out the oxygen from the ceramic layer in the volatilization by oxidation and gasification during the subsequent step of sintering the ceramic at a high temperature, which can lower the strength of the ceramic material or adversely affect the electrical characteristics such as electrostatic capacity and insulation resistance. Also, the residual carbon lowers the melting point of the nickel powder and may cause over-sintering.

A nickel powder obtained by the method disclosed in Japanese Patent Publication No. 2006-37195 A has on its surface a compound containing nickel and sulfur, such as Ni—S or Ni—S—O, the effect of which is that redox of nickel is suppressed and sintering is delayed, in addition to which, research by the inventors of the present invention has revealed that the above-mentioned sudden combustion of the resin at low temperature during binder removal can be suppressed. However, a problem with a conductor paste in which a nickel powder such as this is used is that the nickel undergoes oxidation when the binder removal is performed in an atmosphere that includes oxygen. Specifically, for the binder to be removed efficiently, the binder removal is usually carried out in an oxidizing atmosphere, such as air or nitrogen containing several percent oxygen. The above-mentioned nickel powder, however, does not have sufficient oxidation resistance, and may undergo oxidation in these atmospheres. If the nickel is excessively oxidized in the binder removal step, then when it is subsequently fired at a high temperature in a reducing atmosphere, reduction of the oxides will generate a gas and change the volume, so that a dense electrode is not obtained, and will also cause cracking and delamination in the multilayer electronic component.

SUMMARY OF THE INVENTION

It is an object of the present invention to solve the above problems and provide a nickel powder that has a low activity, despite being fine, and exhibits a good sintering behavior, has a high oxidation resistance and has a low sensitivity to its atmosphere during firing, particularly during binder removal. It is another object of the present invention to provide a conductor paste that can be used to form electrodes and provide a multilayer electronic component having electrodes that are extremely thin and have few voids and no delamination, cracks, or other such structural defects, and to use this paste to efficiently manufacture a multilayer ceramic electronic component that has excellent electrical characteristics and good reliability.

Embodiments of the present invention are:

(1) A nickel powder with an average particle size of 0.05 to 1.0 µm, which is composed of nickel particles having an oxidized surface layer and containing sulfur,
wherein the sulfur content with respect to the total weight of the powder is 100 to 2000 ppm, and
the intensity of a peak identified to sulfur bonded to nickel in surface analysis by ESCA of the nickel particles varies in a direction toward the center from the surface of the particles, and this intensity has its maximum at a location deeper than 3 nm from the particle outermost surface.

(2) The nickel powder according to (1) above, wherein the intensity of the peak identified to sulfur bonded to nickel in surface analysis by ESCA has its maximum in the oxidized surface layer.

(3) The nickel powder according to (1) or (2) above, wherein there is a peak at a binding energy of approximately 168 eV when surface analysis is performed by ESCA in the region of the nickel particles at a depth of 1 nm from the outermost surface.

(4) The nickel powder according to any of (1) to (3) above, wherein the outermost surface of the oxidized surface layer is substantially composed of nickel oxide.

(5) The nickel powder according to any of (1) to (4) above, wherein the total amount of oxygen present in the powder is 0.1 to 4.0 wt % with respect to the total weight of the powder.

(6) A method for manufacturing a nickel powder, wherein a powder composed of nickel particles containing sulfur is subjected to a surface oxidation treatment in a short time by being dispersed in a non-oxidizing gas atmosphere and brought into contact with an oxidizing gas at a temperature between 300 and 800° C.

(7) A method for manufacturing a nickel powder, wherein a powder composed of nickel particles containing sulfur is produced in a dispersed state at a high temperature in a non-oxidizing gas atmosphere, then cooled, and subjected to a surface oxidation treatment in a short time by being brought into contact with an oxidizing gas at a stage when an atmosphere temperature is dropped to between 300 and 800° C. in the course of being cooled.

(8) A conductor paste for forming an electrode of a multilayer ceramic electronic component, containing the nickel powder according to any of (1) to (5) above.

(9) A multilayer ceramic electronic component, wherein an electrode is formed using the conductor paste according to (8) above.

The nickel powder of the present invention is an extremely fine powder with an average particle size of 0.05 to 1.0 µm and, particularly an average particle size of 0.5 µm or less, at which it has a low activity and its sintering commencement temperature is shifted to a higher temperature. Also, the explosive decomposition of the resin at low temperature is suppressed and, as a result, binder removal can be carried out extremely well in a non-oxidizing atmosphere and, because the powder has high oxidation resistance, oxidation does not proceed, even when binder removal is performed in an oxidizing atmosphere containing oxygen, and there is little volumetric change caused by redox during firing. Accordingly, there is a wide window with respect to oxygen concentration in the atmosphere during binder removal and binder removal is possible both in a non-oxidizing atmosphere and in an oxidizing atmosphere containing oxygen in an amount from several ppm to about 20%. Therefore, when a conductor paste obtained using the nickel powder of the present invention is used in the manufacture of a multilayer electronic component, a dense internal electrode can be formed with few voids, excellent continuity, a thin size, and low resistance. Also, a multilayer electronic component can be manufactured that has no structural defects such as cracking or delamination, and has excellent characteristics. Therefore, even with a highly laminated article with thin ceramic layers and internal electrode layers, a multilayer ceramic electronic component of high reliability can be obtained at a good yield.

Also, with the manufacturing method of the present invention, a sulfur-containing nickel powder dispersed in a non-oxidizing gas atmosphere is brought into contact with an oxidizing gas at a high temperature, allowing the above-mentioned nickel powder to be manufactured efficiently.

DETAILED DESCRIPTION OF THE PREFERRED EMBODIMENTS

Figure 1:
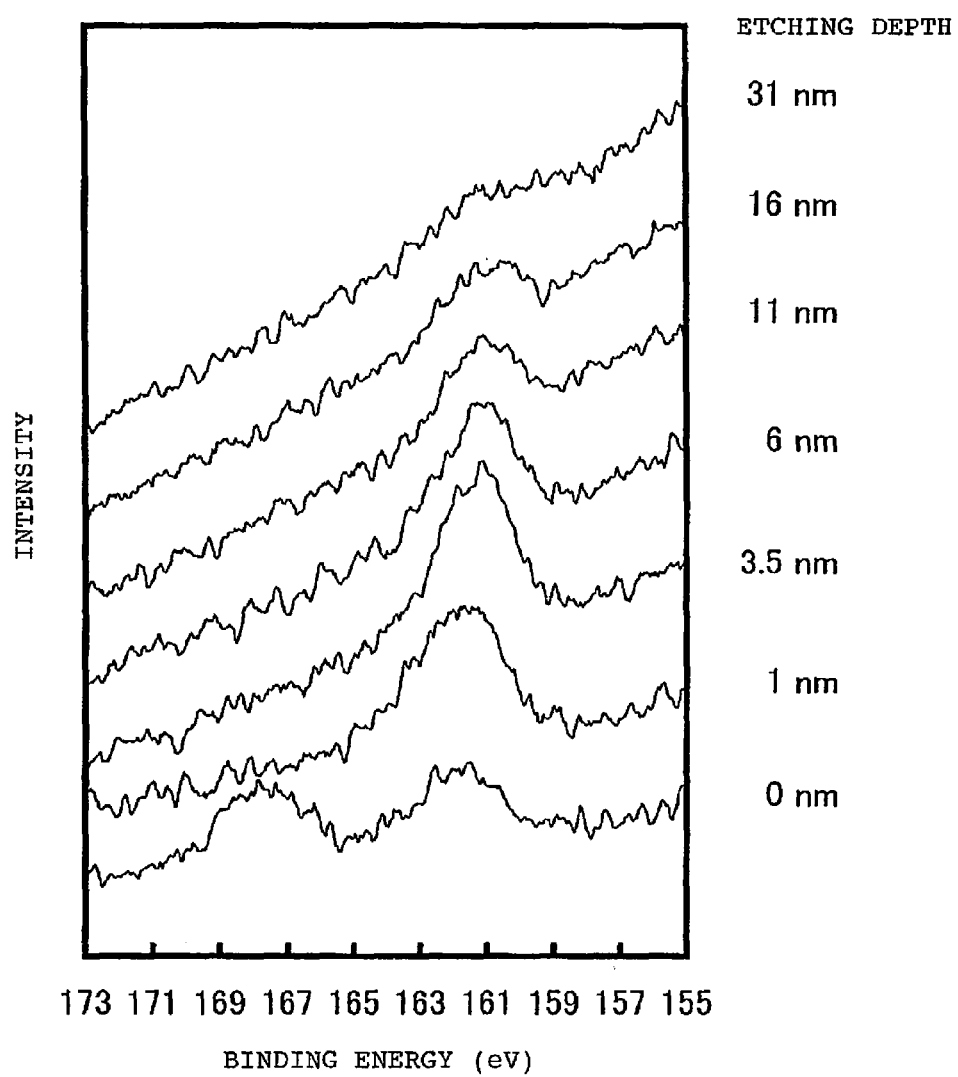
FIG. 1 shows the results of surface analysis by ESCA performed either without etching the nickel powder particles obtained in Example 1 or after they had been etched to different etching depths.

The nickel powder of the present invention is a fine powder having an average particle size within a specific range, in which each individual particle has an oxidized surface layer, contains sulfur and sulfur atoms bonded to nickel atoms are scarce in the region near the outermost surface.

If the average particle size of the nickel powder is less than 0.05 μm, the activity will be too high and sintering at a low temperature or combustion of the resin at low temperature cannot be suppressed. Also, in the manufacture of a conductor paste, a large quantity of solvent, dispersant, or other such organic component is necessary to disperse such excessively small nickel powder in a paste and obtain the desired viscosity characteristics, making it difficult to obtain a dense electrode dry film. Also, the average particle size of a nickel powder needs to be 1.0 μm or less in order to reduce the thickness of an internal electrode layer so as to meet the need to obtain a multilayer electronic component that is more miniaturized and has a greater lamination. In particular, to form a thin internal electrode layer that is dense and has a high smoothness, it is preferable to use a spherical powder with an average particle size of 0.1 to 0.5 μm and a specific surface area of 1.5 to 6.0 m$^2$/g, and which is extremely fine and has good dispersibility. In the present invention, unless otherwise specified, the average particle size of the powder expresses the particle size as converted from specific surface area measured by BET method.

With the present invention, the nickel powder may be any one that contains nickel as its main component, and may be either pure nickel powder or a nickel alloy powder whose main component is nickel. Examples of the other metal components besides nickel in this alloy include copper, cobalt, iron, silver, palladium, rhenium, platinum, ruthenium, rhodium, and iridium. The proportion of the metal components other than nickel in the alloy is preferably no more than 30 wt % in total. From here on, such alloy powders will also be collectively referred to simply as a "nickel powder" in the present invention. In these alloy powders, when the oxidized surface layer of the particles comprises nickel oxide as a main component, such alloy powders exhibit the same behavior as with a pure nickel powder whose surface is oxidized, so in the following description, substances which contain nickel oxide and metal oxides other than nickel oxide will be collectively referred to simply as a "nickel oxide."

A thin oxide layer of nickel must be present on the surface of the nickel particles in the nickel powder of the present invention. The oxidized surface layer is preferably a layer substantially composed of nickel and a nickel oxide, and, preferably, its outermost surface is substantially composed of a nickel oxide. Further, in the oxidized surface layer, the particle structure is preferably such that the oxygen concentration steadily decreases from the outermost surface toward the inside. Such a powder is very effective at suppressing cracking and delamination, and allows an electrode with higher continuity to be formed. The likely reason for this is that the oxidized layer on the particle surface is extremely stable and strong, and the oxidized layer is not readily decomposed during binder removal, for example, so the activity of the particles is effectively reduced, and the sintering commencement temperature is raised. The phrase "substantially composed of nickel and a nickel oxide" as used here means that almost everything other than the sulfur is nickel and a nickel oxide. Also, the phrase "substantially composed of a nickel oxide" means that almost everything other than the sulfur is a nickel oxide. In neither case, however, is it precluded that tiny amounts of carbon or other elements will be contained as impurities.

The total amount of oxygen contained in the powder is preferably 0.1 to 4.0 wt %, as the ratio to the nickel powder. If the oxygen content is less than 0.1 wt %, the oxidized layer will not be able to cover the surface uniformly, so it will have less ability to lower the activity of the nickel. On the other hand, if the amount is over 4.0 wt %, considerable gas generation and volumetric change will be caused by reduction of the nickel oxide during firing in a reducing atmosphere, so it will be more difficult to obtain a dense electrode film, and suppressing cracking and delamination in a multilayer electronic component will tend to be more difficult. It is particularly favorable for the amount to be from 0.2 to 3.0 wt %, with a range of 0.3 to 2.0 wt % being especially good.

With the present invention, the total amount of oxygen contained in the nickel powder is expressed as the amount of oxygen that is freed when the powder is heated up to 900° C. in a reducing atmosphere. More specifically, it is expressed as the remainder of subtracting the amount of volatile elements other than oxygen (such as carbon or sulfur) that are volatilized when the powder is heated from room temperature up to 900° C. in a reducing atmosphere composed of N$_2$ gas containing 4% H$_2$, from the ignition loss measured as the percentage weight change caused during the above heating of from room temperature to 900° C. The amount of oxygen present in the depth direction from the outermost surface of the particles is measured by ESCA, just as with the sulfur.

The amount of sulfur contained in the nickel powder of the present invention is 100 to 2000 ppm, calculated as sulfur atoms, with respect to the total weight of the powder. If the amount is less than 100 ppm, the effect of lowering the surface activity of the nickel particles is small, but if it is over 2000 ppm, it may adversely affect the dielectric characteristics, and it will no longer be possible to ignore damage to the furnace by the sulfur-containing gas generated during firing of the multilayer ceramic electronic component. The total amount of sulfur contained in the powder is measured with a commercially available carbon sulfur analyzer, for example.

With the present invention, the sulfur present near the surface of the particles is measured by ESCA (electron spectroscopy for chemical analysis). Specifically, the surface of the particles is analyzed by ESCA to check whether there is a peak identified to sulfur. The bonding state of sulfur can be determined from the variation in the binding energy of this peak, and the amount of sulfur present in a specific bonding state is calculated relatively from the intensities of the peaks. What is usually obtained by ESCA analysis is information about a very thin layer of the particle surface down to a depth of about a few nanometers. For instance, when an MgKα with an energy of 1250 eV is used as a source, information related to $2p_{3/2}$ of sulfur with a binding energy of approximately 160 to 170 eV is estimated at about 3 nm from the mean free path of the generated photoelectrons. Therefore, the amount of sulfur present inside the particles at a certain depth from the particle outermost surface can also be examined by subjecting the surface to ESCA analysis after etching the particles to that depth with argon ions or the like.

The nickel powder of the present invention includes a specific amount of sulfur but when each constituent particle is subjected to the above-mentioned analysis, the intensity of the peak identified to sulfur bonded to nickel (hereinafter also referred to as "Ni—S") varies, that is, it increases and decreases, toward the center from the surface of the particles, and this intensity reaches its maximum at a location deeper than 3 nm from the outermost surface. This means that the Ni—S concentration is low at the outermost surface and a region of high concentration is on the inside. In particular, it is preferable that there be substantially no Ni—S exposed on the particle outermost surface. The "peak identified to Ni—S" is, in more specific terms, a peak present near a binding energy of approximately 162 eV.

Research conducted by the inventors has revealed that nickel-sulfur bonds are highly reactive with oxygen and, if a large quantity of Ni—S is present on the surface of the particles as in Japanese Patent Publication No. 2006-37195 A, the nickel particles will be more prone to oxidation. Therefore, when binder removal is performed in an atmosphere in which oxygen is present, the oxidation of nickel is apt to proceed. The nickel particles of the present invention, however, have a thin oxidized layer on their surface and highly reactive Ni—S has the above-mentioned distribution, the result of which is that the particles exhibit extremely low activity and, in addition, exhibit an excellent oxidation resistance and, when used for an internal electrode in a multilayer electronic component, no further oxidation of nickel will proceed, even when binder removal is performed in an oxygen-containing atmosphere. Because of this, it seems that there is little volumetric change caused by redox of the nickel, and the generation of structural defects such as cracking and delamination is suppressed. Therefore, binder removal can be performed over a wider range of conditions, from a non-oxidizing atmosphere to an atmosphere that is fairly oxidative.

As mentioned above, the Ni—S peak intensity reaches its maximum at a location deeper than 3 nm from the particle outermost surface but it is particularly favorable for this peak intensity to be within the oxidized surface layer. In other words, it is preferable that there be an Ni—S concentration gradient such that the peak intensity is low at the outermost surface of the particles, then increases toward the interior, reaching its maximum in the oxidized surface layer and then decreases again toward the center of the particles. With a concentration gradient such as this, it is believed that the nickel activity can be markedly reduced with a small amount of sulfur. Accordingly, even when binder removal is performed in a non-oxidizing atmosphere, there is no explosive decomposition of the resin at low temperatures, nor any increase in residual carbon as a result of this, and structure defects of the multilayer electronic component, and degradation of its characteristics, are prevented very well. Also, the Ni—S present in the region slightly to the inside within the oxidized surface layer is believed to act to raise the stability of the oxidized surface layer and is surmised to prevent the oxidized layer from being reduced, even when the atmosphere becomes reductive due to the decomposition of organic substances during binder removal. As discussed above, the Ni—S peak intensity reaches its maximum at a location deeper than 3 nm from the particle outermost surface but, for the above-mentioned effect to be obtained reliably with a small amount of sulfur, it is preferable for the peak intensity to reach its maximum at a location of no more than 10 nm from the particle outermost surface.

Also, with the present invention, in addition to the Ni—S having the above-mentioned distribution, it is preferable that a peak be detected at a binding energy of approximately 168 eV in surface analysis of the particles by ESCA. The peak at this energy is believed to indicate the presence of sulfur bonded to oxygen, although this is not entirely clear. This peak is preferably present in the region within a depth of 1 nm from the outermost surface of the particles, or its intensity is preferably about the same as or greater than the intensity of the peak identified to Ni—S in the same region. Nickel particles with which this peak is detected on the particle surface have superior oxidation resistance and the effect of suppression oxidation in an oxidizing atmosphere is even more pronounced.

(Manufacture of Nickel Powder)

Although not necessary, the nickel powder is preferably manufactured by subjecting nickel particles already containing sulfur to surface oxidation. The surface oxidation treatment is preferably performed in a short time so as to prevent the contained sulfur from being oxidized and vaporized. For example, one method that can be employed favorably is to instantaneously oxidize the surface of nickel particles by bringing them into contact with an oxidizing gas in a gas phase and at high temperature and then quenching them.

More specifically, nickel particles are subjected to surface oxidation by dispersing a nickel powder composed of nickel particles containing sulfur (hereinafter referred to as a "sulfur-containing nickel powder") in a heated non-oxidizing gas atmosphere and exposing it to air or another such oxidizing gas. It is preferable here for the powder to be brought into contact with an oxidizing gas at an atmosphere temperature of about 300 to 800° C. It is also preferable for the surface oxidation to be carried out for just a short time, specifically no more than 10 seconds, and it is especially favorable to perform instantaneous oxidation in 1 second or less by a method such as blowing in a large quantity of oxidizing gas. With this method, there is no agglomeration of the powder particles, an oxidized surface layer that is strong and homogenous can be formed in suitable quantity, and there will be little Ni—S near the outermost surface of the produced particles, with its concentration reaching a maximum at a location deeper than 3 nm from the particle outermost surface. The amount of surface oxidation of the produced powder can be adjusted, for example, by varying the temperature or duration of contact between the particles and the oxidizing gas, or the oxygen concentration in the oxidizing gas.

In particular, when the above sulfur-containing nickel powder is manufactured in a vapor or gas phase, for example, by chemical vapor deposition (CVD), physical vapor deposition (PVD), a spray pyrolysis method, or a method described in Japanese Patent Publications No. 2002-20809A and 2004-99992A by which a metal compound powder is subjected to thermal decomposition in a gas phase, it is preferable that air or another oxidizing gas be mixed in during a step in which a nickel powder produced at high temperature is cooled while still highly dispersed in a gas phase, so that surface oxidation and cooling will be accomplished in a short time as discussed above. Specifically, when a sulfur-containing nickel powder is produced in a state of being dispersed at high temperature in a non-oxidizing gas atmosphere and then cooled, the surface oxidation and cooling of the particles are carried out simultaneously by bringing the nickel particles into contact with an oxidizing gas at the stage when the atmosphere temperature has cooled to between 300 and 800° C. Here again, the oxidation is preferably performed instantaneously by blowing in a large quantity of oxidizing gas.

There are no restrictions on the method for having the sulfur be contained in the nickel powder, but examples include a method in which a nickel powder and a sulfur powder are mixed and then heated in a sealed vessel, and a method in which a gas containing sulfur, such as hydrogen sulfide gas, sulfurous acid gas, or a mercaptan compound, a thiophene compound, or another such organic sulfur compound, is made to flow through and react with a nickel powder. When a nickel powder is manufactured in the vapor or gas phase as discussed above, a sulfur-containing nickel powder is obtained either by adding a sulfur compound to the nickel raw material, or adding hydrogen sulfide gas, sulfurous acid gas, or a gas of an organic sulfur compound to the vapor or gas phase.

(Conductor Paste)

The conductor paste of the present invention contains the above-mentioned nickel powder as a conductive powder, which is dispersed in a vehicle composed of a resin binder and a solvent. A conductive powder other than the above-mentioned nickel powder may be added as the conductive powder.

There are no particular restrictions on the resin binder and any one that is normally used in conductor pastes may be used, examples of which include ethyl cellulose, hydroxyethyl cellulose, and other such cellulose resins, acrylic resin, methacrylic resin, butyral resin, epoxy resin, phenol resin, rosin, and so forth. There are no particular restrictions on the amount in which the resin binder is contained but it is usually about 1 to 15 weight parts per 100 weight parts of the conductive powder.

There are no particular restrictions on the solvent as long as it will dissolve the resin binder, and any one that is normally used in conductor pastes may be selected as desired, but examples include organic solvents based on alcohols, ketones, ethers, esters, hydrocarbons, and so on; water; and mixtures of these solvents. There are no restrictions on the amount of solvent as long as it is used in an ordinary amount, and the amount can be suitably selected according to the properties of the conductive powder, the type of resin, the applying method, and so forth. Usually the amount is about 40 to 150 weight parts per 100 weight parts of the conductive powder.

In addition to the above-mentioned components, the conductor paste of the present invention may suitably contain other commonly used components in accordance with the intended use, examples of which include a ceramic that is the same as the ceramic contained in the ceramic sheet or that has a similar composition thereto, as well as glass, alumina, silica, copper oxide, manganese oxide, titanium oxide and other metal oxides, montmorillonite and other inorganic powders, an organometallic compound, a plasticizer, a dispersant and a surfactant.

The conductor paste of the present invention is manufactured by kneading the nickel powder and the other additives along with a binder resin and a solvent, and dispersing the components uniformly to obtain a product in the form of a paste, a paint, or an ink. The conductor paste thus obtained is particularly well suited to forming inner electrodes of multilayer ceramic electronic components in particular, multilayer capacitors, multilayer inductors, multilayer actuators, and so on. Also, the conductor paste can be used for forming terminal electrodes of ceramic electronic components or thick film conductor circuits.

(Multilayer Ceramic Electronic Component)

The multilayer ceramic electronic component is manufactured by the known method by using the conductor paste in accordance with the present invention for forming inner electrodes. A method for manufacturing a multilayer ceramic capacitor will be described below by way of an example.

First, a dielectric ceramic raw material powder is dispersed in a resin binder, the dispersion is formed into sheets, by a doctor blade method or the like, and ceramic sheets are fabricated. The dielectric ceramic raw material powder to form the dielectric layers is usually, a powder whose main component is a perovskite-type oxide such as one based on barium titanate, strontium titanate, strontium zirconate, or calcium strontium zirconate, or a compound obtained by replacing some of the metal elements constituting these oxides with another metal element. If necessary, a variety of additives for adjusting the capacitor characteristics can be mixed with those raw material powders. The conductor paste in accordance with the present invention is applied onto the ceramic sheets obtained by using the usual method such as screen printing and dried to remove the solvent and form a dry film of the inner electrode paste of the predetermined pattern. The predetermined number of ceramic sheets, each having the inner electrode paste dry film formed thereon, are stacked and laminated under pressure to fabricate an unfired multilayer body. The multilayer body is cut to the predetermined shape, treated to remove the binder at a temperature of about 250 to 350° C. in an inert gas atmosphere or an inert gas atmosphere comprising a small amount of oxygen, thereby decomposing and dissipating the vehicle components. The multilayer body is then fired at a high temperature of about 1000 to 1400° C. in a nonoxidizing atmosphere to sinter simultaneously the dielectric layers and electrode layers, and an oxidation treatment is performed again, if necessary, to obtain a multilayer ceramic capacitor body. Terminal electrodes are thereafter formed by firing on both end surfaces of the multilayer ceramic capacitor body. The terminal electrodes may be also formed by applying a conductor paste onto both end surfaces of the chip obtained by cutting the unfired multilayer body and then co-firing with the multilayer body.

The present invention will now be described in more specific terms by giving Examples, but the present invention is not limited to or by these examples.

Example 1

A powder of nickel acetate tetrahydrate with an average particle size of about 100 μm was supplied to a jet mill at a rate of 500 g/hr, and was pulverized and dispersed with nitrogen gas at a flow rate of 200 L/min. The dispersed gas flow was introduced directly into the reaction tube of an electric furnace heated at 1550° C., and the nickel acetate tetrahydrate was heated and decomposed to produce a nickel powder. The powder produced here was made to contain sulfur by supplying hydrogen sulfide gas from near the inlet to the reaction tube of the dispersed gas flow. The above-mentioned nickel powder produced at high temperature was cooled by being passed through a cooling tube connected to the outlet side of the reaction tube, in the course of which a large quantity of air was blown in near the outlet of the cooling tube, so that the surface of the nickel particles was instantaneously (within 1 second or less) oxidized and further cooled at the same time, and the powder was trapped in a bag filter. The temperature of the atmosphere where the powder came into contact with the air was approximately 600° C. as measured by thermocouple.

The nickel powder thus obtained was examined under a scanning electron microscope (SEM), which confirmed that spherical particles had been produced. The specific surface area of the powder measured by BET method was 3.3 m$^2$/g, or approximately 0.2 µm converted to particle size. The sulfur content measured by carbon-sulfur analyzer (EMIA-320V made by Horiba Ltd.) was 900 ppm, and the oxygen content (ignition loss) was 1.4 wt %.

Figure 2:
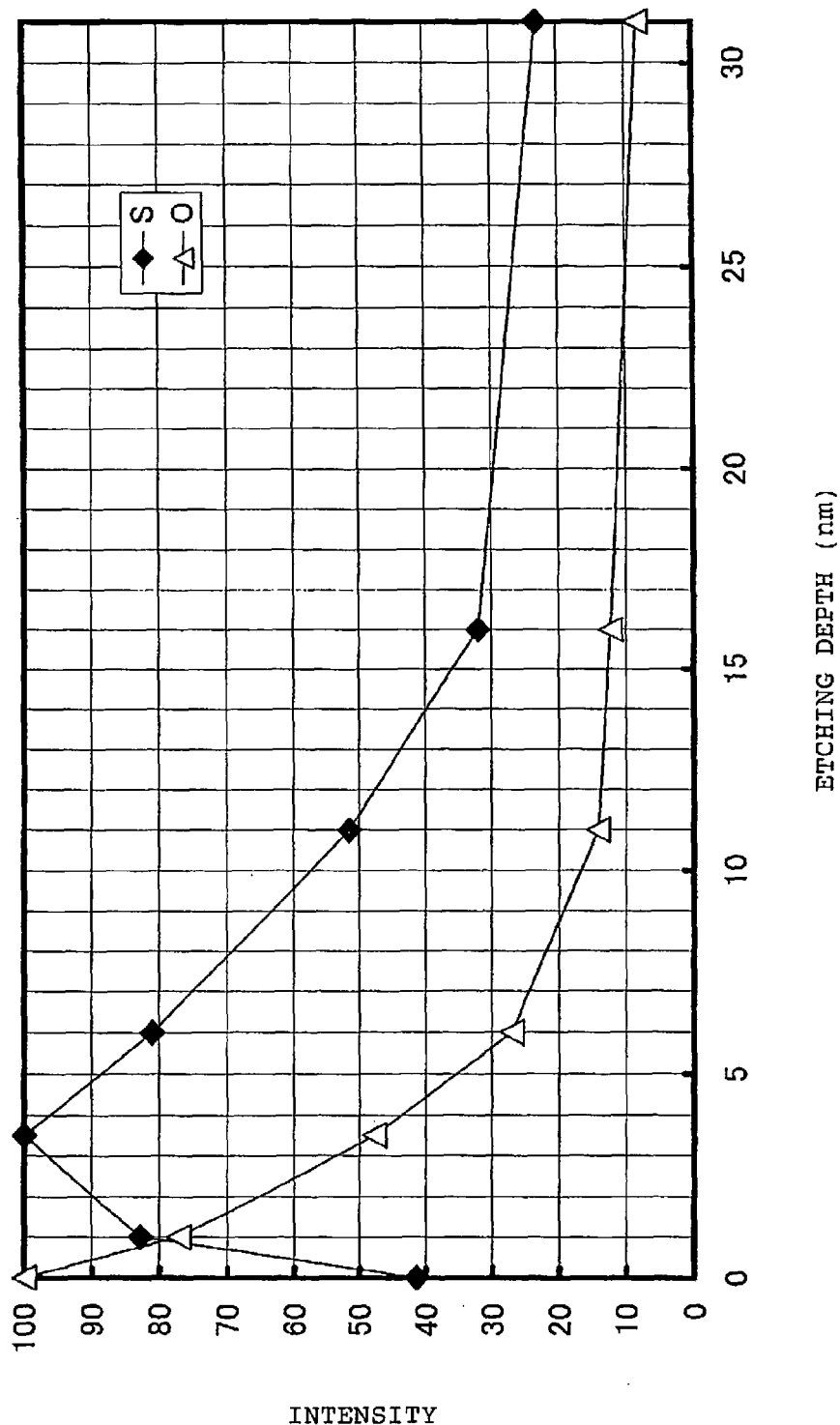
FIG. 2 shows the change, depending on the etching depth, in the peak intensity for sulfur bonded to nickel (Ni—S) in the ESCA surface analysis results from FIG. 1 and also shows the change, depending on the etching depth, in the oxygen peak intensity.

Surface analysis was performed by ESCA (ESCA-3400 made by Kratos Analytical Ltd.) to see how the sulfur was present near the particle surface of the resulting nickel powder. FIG. 1 shows the intensity change due to argon ion etching in the $2p_{3/2}$ peak of sulfur measured at a binding energy between 155 and 173 eV. The intensity of the peak at a binding energy of approximately 162 eV identified to sulfur bonded to nickel (Ni—S) reached its maximum at an etching depth of approximately 3.5 nm. If we let the intensity at this point be 100, FIG. 2 shows the relative change in peak intensity versus etching depth. FIG. 2 also shows the change by etching depth in the oxygen peak at a binding energy of approximately 530 eV, just as with Ni—S. The oxygen peak intensity was at its maximum at the particle outermost surface, and decreased as etching proceeded.

The peak at a binding energy of approximately 168 eV was also observed (FIG. 1) in addition to the peak at a binding energy of approximately 162 eV, in ESCA measurement of the unetched particle surface. It is surmised from this binding energy value that this peak is identified to sulfur bonded to oxygen, but the peak did not disappear even after the powder was washed with water, nor did it disappear when the powder was heated, as will be discussed below. It was concluded from this that the sulfur component was not merely a sulfur oxide gas that had been adsorbed, but rather was firmly bonded to the particle surface. This peak did disappear after etching to 1 nm, which tells us that sulfur bonded to oxygen (surmised; hereinafter sometimes referred to as S—O) is present in the region down to a depth of 1 nm from the outermost surface.

The results of the above-mentioned ESCA analysis are results for when the incident X-ray source was the Mg—Kα (1250 eV), and estimating from the photoelectron escape depth, information is included for the region down to a depth of approximately 3 nm from the outermost surface (when etching is performed, from the outermost surface after etching). In view of this, analysis was conducted without etching and at an incident X-ray beam energy of 610 eV using synchrotron light at Kyushu Synchrotron Light Research Center established by Saga Prefecture. Under these conditions, information related to sulfur was obtained down to a depth of approximately 1 nm from the outermost surface. Analysis confirmed that there was no Ni—S peak, and only a peak at a binding energy of approximately 168 eV.

It can be seen from the above results that, with these nickel particles, sulfur is present in the same region as the oxidized layer of the particle surface, that the distribution of sulfur has a maximum value at a location deeper than 3 nm from the outermost surface, that S—O is present, and no Ni—S is present, in the region down to a depth of approximately 1 nm from the outermost surface, and that no S—O is present, and only Ni—S is present, in the region deeper than 1 nm.

Comparative Example 1

The same ESCA analysis as in Example 1 was performed on a nickel powder for the internal electrodes of a commercially available multilayer electronic component, which powder had a specific surface area of 3.5 m$^2$/g (approximately 0.2 µm converted to particle size), a sulfur content of 1100 ppm, and an oxygen content of 1.4 wt %.

Figure 3:
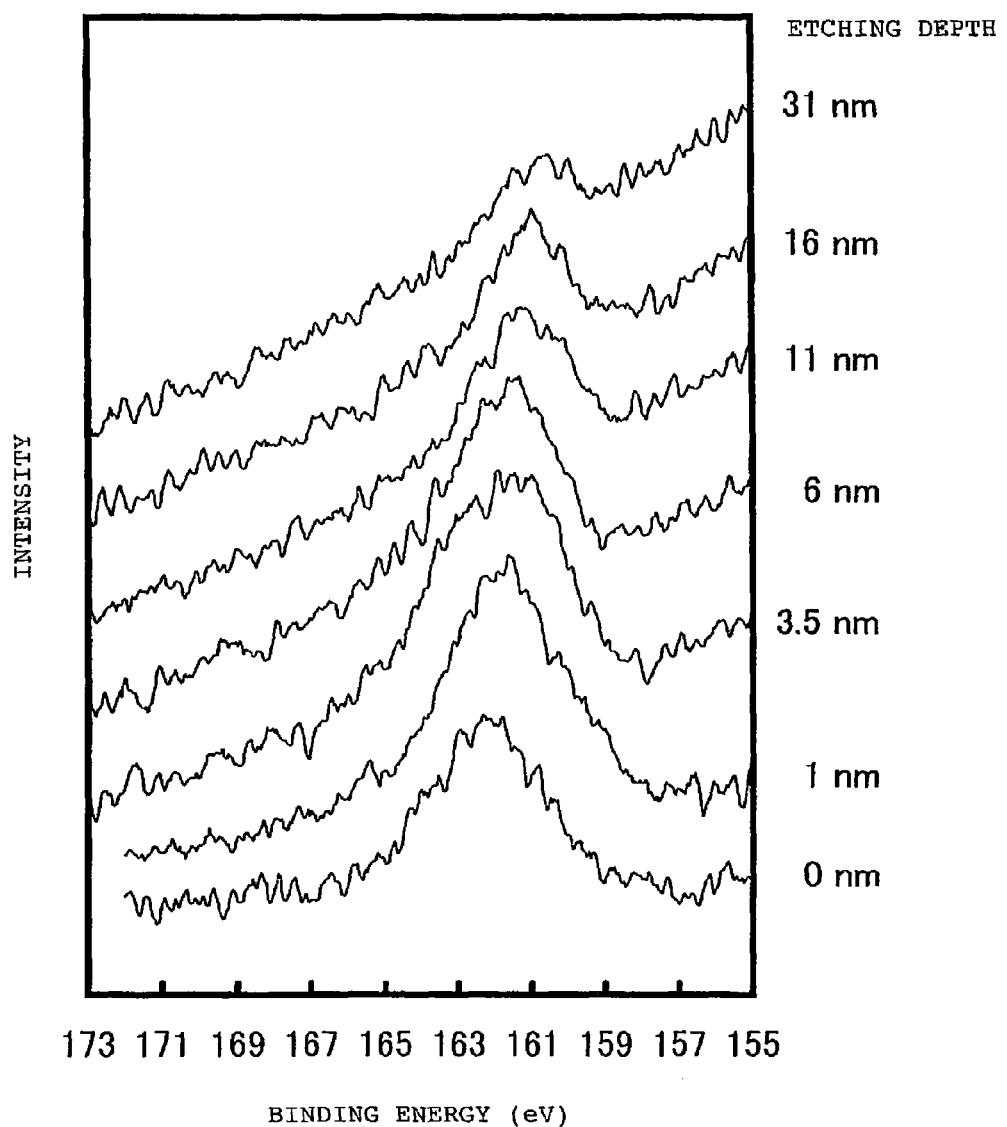
FIG. 3 shows the results of surface analysis by ESCA, performed in the same manner as in Example 1, for the nickel powder particles of Comparative Example 1.
Figure 4:
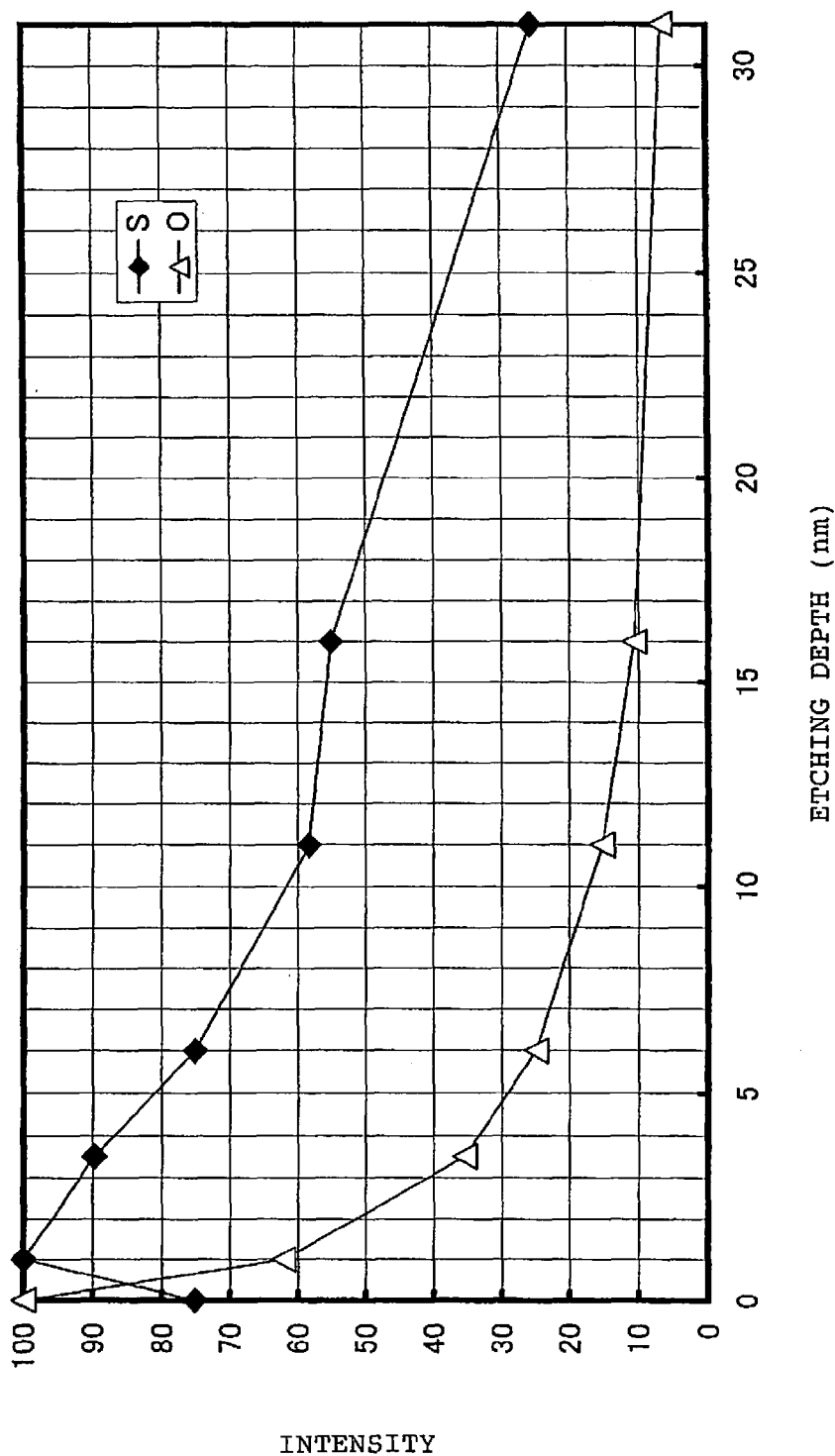
FIG. 4 shows the change, depending on the etching depth, in the peak intensity for Ni—S in the ESCA surface analysis results from FIG. 3 and also shows the change, depending on the etching depth, in the oxygen peak intensity.

The results are shown in FIG. 3. The Ni—S peak intensity was at its maximum at an etching depth of 1 nm. If we let the intensity at this point be 100, FIG. 4 shows the relative change in peak intensity versus etching depth. FIG. 4 also shows the intensity change depending on the etching depth in the oxygen peak at a binding energy of approximately 530 eV. It can be seen from FIGS. 3 and 4 that more sulfur bonded to nickel is present in the region closer to the outermost surface than in Example 1, that is, in the region less than 3 nm deep from the outermost surface. Also, in measurement without etching, no peak was observed at a binding energy of approximately 168 eV, which is surmised to be identified to S—O.

Figure 5:
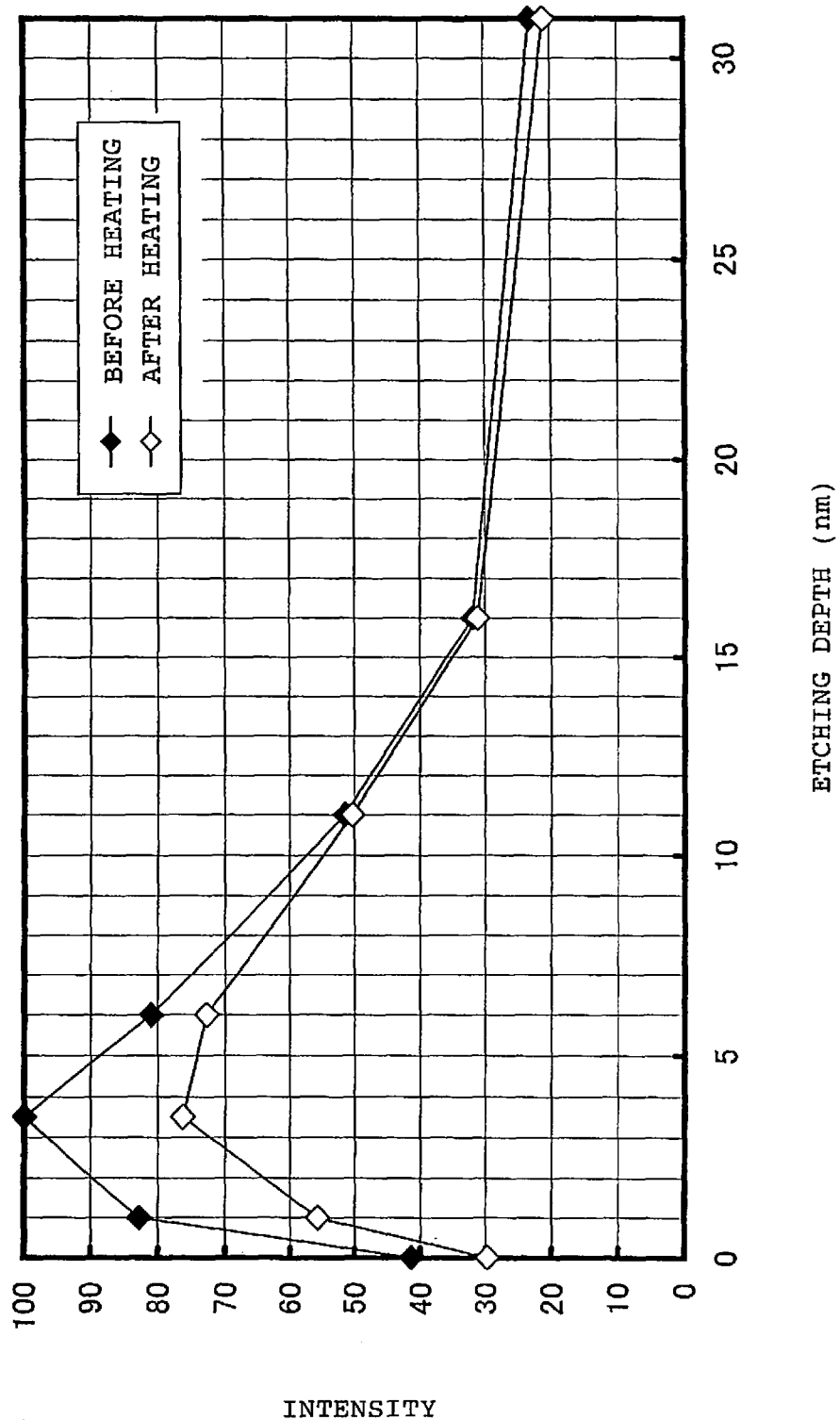
FIG. 5 shows the change depending on the etching depth in the peak intensity for Ni—S before and after heating of the nickel powder obtained in Example 1.
Figure 6:
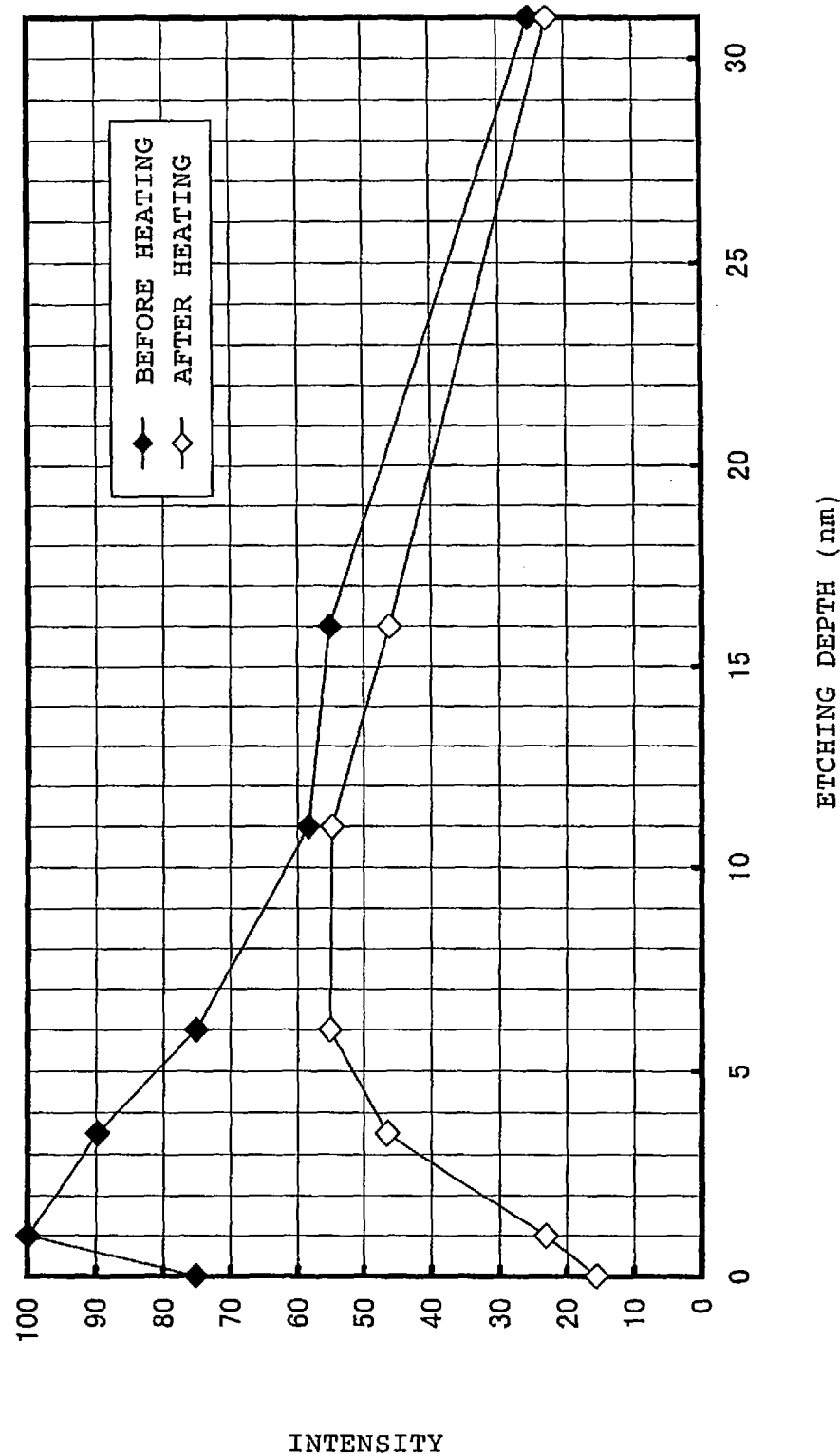
FIG. 6 shows the change depending on the etching depth in the peak intensity for Ni—S before and after heating of the nickel powder obtained in Comparative Example 1.
Figure 7:
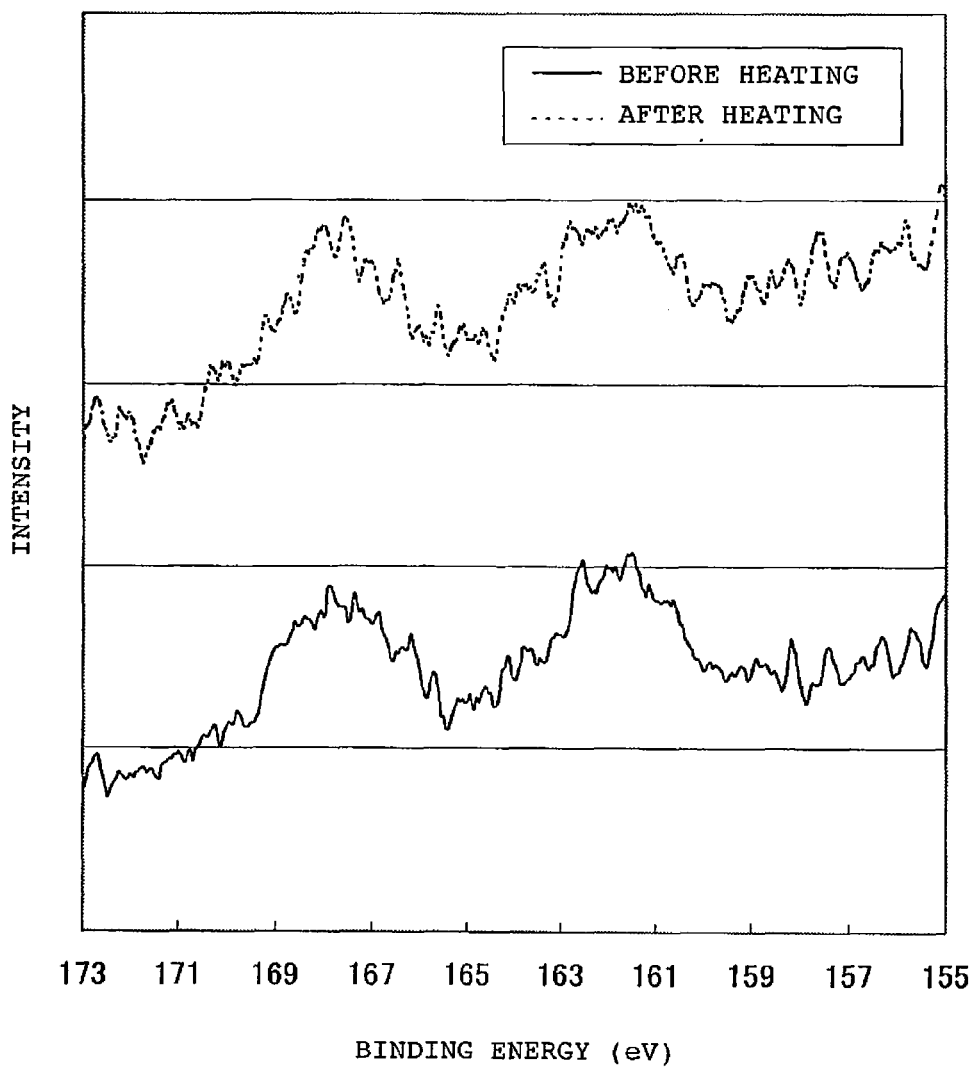
FIG. 7 shows the ESCA surface analysis results when the nickel powder obtained in Example 1 was not etched.

The nickel powders of Example 1 and Comparative Example 1 were each heated for 30 minutes at 250° C. in air, sulfur analysis was performed by ESCA in the same manner, and the results were checked for a change in intensity before and after heating for a peak at a binding energy of approximately 162 eV identified to Ni—S. If we assume that the maximum peak intensity before heating is 100 for each powder, FIG. 5 shows the change in peak intensity before and after heating in Example 1, and FIG. 6 shows the same for Comparative Example 1. Heating clearly decreased intensity less in Example 1 than in Comparative Example 1. FIG. 7 shows the change before and after heating in a state in which the powder of Example 1 was not etched. As is clear from FIG. 7, the peak intensity at a binding energy of approximately 168 eV underwent almost no change after heating. It is surmised from the above results that with the powder in Comparative Example 1, the sulfur bonded to nickel present on the particle surface was oxidized and vaporized by heating in the air. In contrast, with the powder of Example 1, it is surmised that oxidation and dissipation of the sulfur were suppressed.

Next, 100 weight parts of each nickel powder from Example 1 and Comparative Example 1, 5 weight parts ethyl cellulose (as a resin binder), and 95 weight parts dihydroterpineol (as a solvent) were kneaded with a triple roll mill to produce conductor pastes. Each paste thus produced was cast in a thickness of about 250 µm over a PET film, and after the paste had dried, the PET film was peeled off to obtain a sample that was cut into small pieces measuring a few millimeters square. Each sample was heated for 5 hours at 300° C. in air to remove the binder, after which the percentage weight loss was examined by the same method as in the measurement of oxygen content (ignition loss) of the powder. As a result, the percentage weight loss was 1.8% for the powder of Example 1, and it was confirmed that there was little difference from the oxygen content of the powder and that almost no oxidation of the nickel had occurred. In contrast, the percentage weight loss was 8.7% for Comparative Example 1, which tells us that the powder was considerably oxidized during the binder removal. It is clear from the above results that the nickel powder of the present invention has superior oxidation resistance.

Example 2

Metallic nickel was heated and evaporated in a reaction vessel by high-temperature nitrogen gas in a plasma state of approximately 10,000° C., and the vapor thus generated was sent into a tubular condenser along with hydrogen sulfide gas, using a mixture of 4% hydrogen and nitrogen gas as a carrier at 100 L/min, thereby a nickel powder containing sulfur was produced. A large quantity of air was blown in near the outlet of the cooling tube, so that the particle surface of the nickel powder was instantaneously (within 1 second or less) oxidized and simultaneously further cooled. The powder was trapped in a bag filter. The temperature of the atmosphere where the powder came into contact with the air was approximately 400° C.

Figure 8:
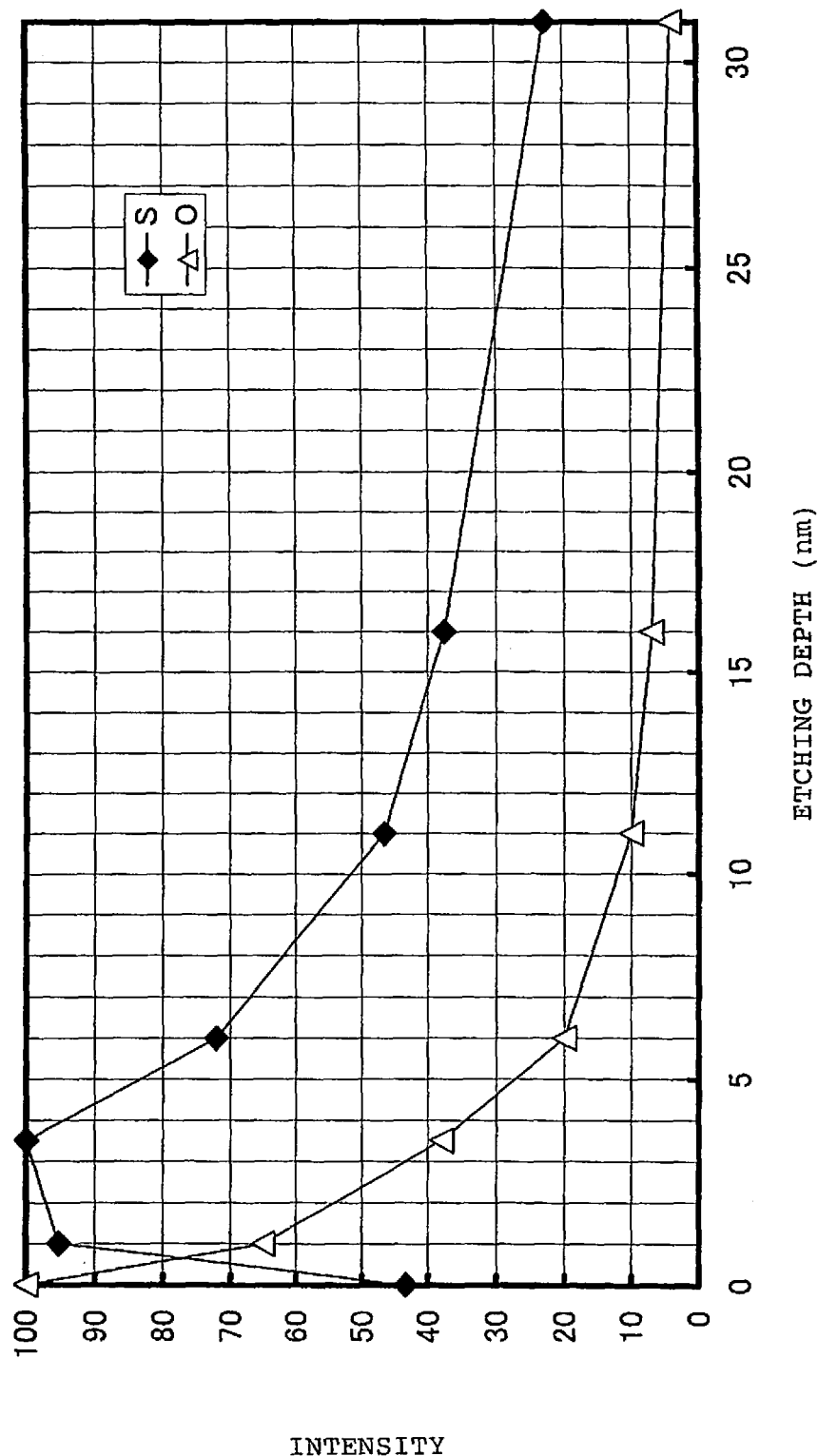
FIG. 8 shows the change depending on the etching depth in the peak intensity for oxygen and the peak intensity for Ni—S in the surface analysis by ESCA of the nickel powder obtained in Example 2.

The nickel powder thus obtained was examined by SEM, which confirmed that spherical particles had been produced. The specific surface area was 4.4 $m^2/g$, or approximately 0.15 μm converted to particle size. The sulfur content was approximately 1800 ppm, and the oxygen content was 0.8 wt %. FIG. 8 shows the change depending on the etching depth in the intensity of the oxygen peak and the Ni—S peak measured by ESCA in the same manner as in Example 1. Just as in Example 1, the Ni—S peak reached its maximum at a etching depth of 3.5 nm. A peak at a binding energy of approximately 168 eV was also confirmed in measurement without etching.

Example 3

A surface-oxidized sulfur-containing nickel powder was manufactured under the same conditions as in Example 1, except that the nickel acetate tetrahydrate was supplied at a rate of 2000 g/hr. The nickel powder thus obtained was examined by SEM, which confirmed that spherical particles had been produced. The specific surface area was 0.7 $m^2/g$, or approximately 1.0 μm converted to particle size. The sulfur content was approximately 250 ppm, and the oxygen content was 0.3 wt %. This powder was analyzed by ESCA, which revealed that the Ni—S peak had its maximum at an etching depth of 3.5 nm, and the same results as in Example 1 were obtained. A peak at a binding energy of approximately 168 eV was also confirmed in measurement without etching.

The powders of Examples 2 and 3 were made into a paste by the same method as in Example 1 and Comparative Example 1, and the degree of oxidation of the powder during the binder removal was examined as with Example 1. As a result, the percentage weight change examined after binder removal was 2.0% for the powder of Example 2 and 0.5% for the powder of Example 3, and oxidation resistance was excellent in both cases.

Comparative Example 2

A surface-oxidized sulfur-containing nickel powder was manufactured under the same conditions as in Example 1, except that the nickel acetate tetrahydrate was supplied at a rate of 1000 g/hr, and the condenser tube was lengthened to adjust the location where air was blown in, so that the atmosphere temperature was 200° C. when the produced powder came into contact with the air. The nickel powder thus produced was examined by SEM, which confirmed that spherical particles had been produced. The specific surface area was 1.8 $m^2/g$, or approximately 0.4 μm converted to particle size. The sulfur content was approximately 600 ppm, and the oxygen content was 0.26 wt %.

Figure 9:
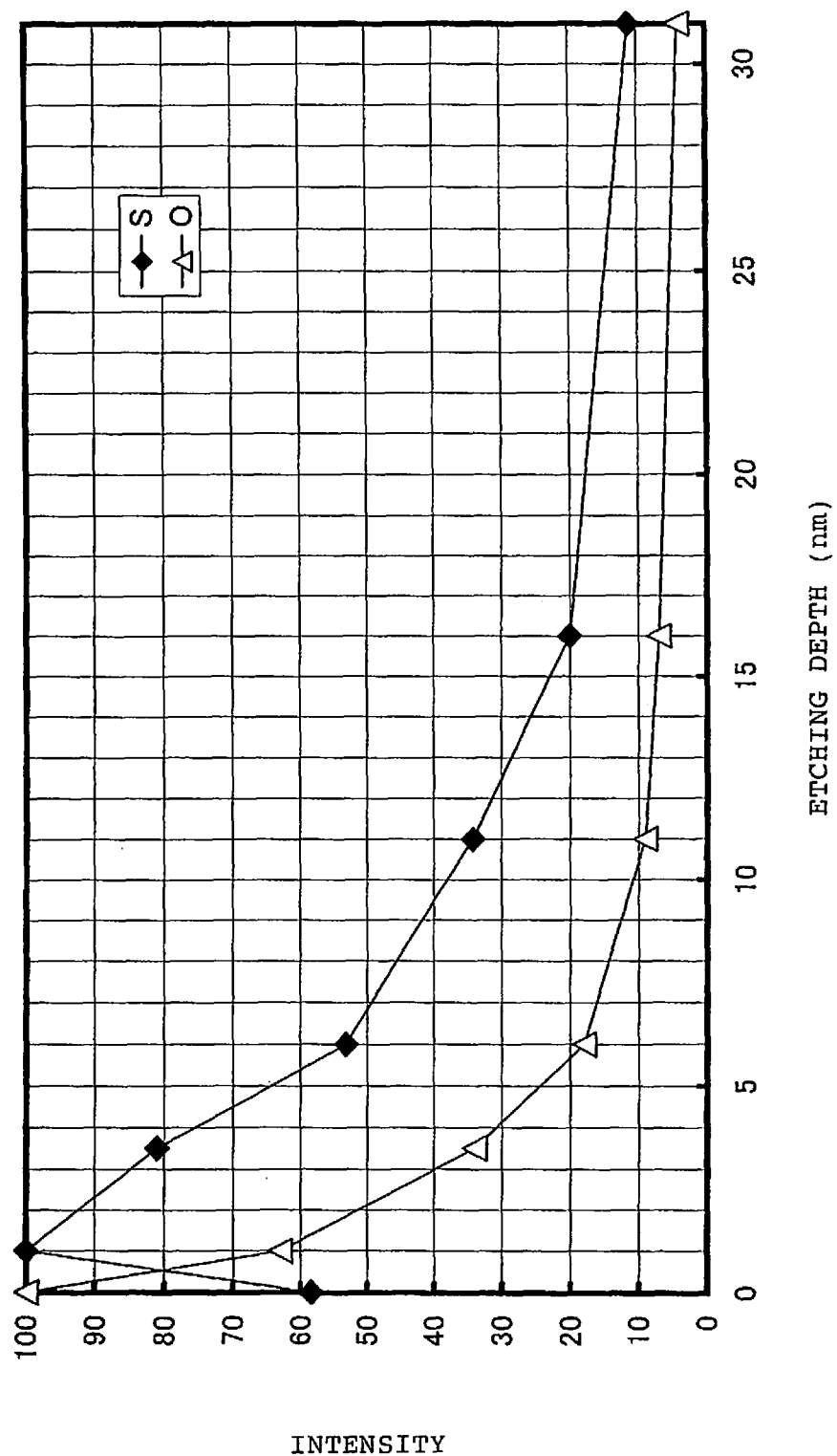
FIG. 9 shows the change depending on the etching depth in the peak intensity for oxygen and the peak intensity for Ni—S in the surface analysis by ESCA of the nickel powder obtained in Comparative Example 2.

Surface analysis was performed by ESCA, and FIG. 9 shows the change depending on the etching depth in the intensity of the peak for oxygen and the peak for Ni—S. It can be seen from FIG. 9 that the amount of Ni—S present reached its maximum in a region extremely close to the outermost surface of the particles, that is, in the region less than 3 nm deep from the outermost surface. Also, in a measurement without etching, a peak was observed at a binding energy of approximately 168 eV. This powder was made into a paste by the same method as above, and the degree of oxidation of the powder during the binder removal was examined as with Example 1. As a result, the percentage weight change examined after binder removal was 5.2%, and the powder had been considerably oxidized.

What is claimed is:

1. A method for manufacturing a nickel powder comprising the step of subjecting a powder composed of nickel particles containing sulfur to a surface oxidation treatment within 10 seconds by dispersing the powder in a non-oxidizing gas atmosphere and bringing the dispersed powder into contact with an oxidizing gas at a temperature between 300 and 800° C.

2. The method according to claim 1, wherein the powder composed of nickel particles containing sulfur is produced in a dispersed state at a high temperature in a non-oxidizing gas atmosphere, then cooled, and subjected to the surface oxidation treatment at a stage when an atmosphere temperature is dropped to between 300 and 800° C. in the course of being cooled.

3. The method according to claim 1, wherein the surface oxidation treatment is for no more than one second.

* * * * *